March 15, 1949. F. C. GULLO 2,464,308
NUT HULLER WITH CIRCULAR CUTTING BLADES
Filed Feb. 18, 1946
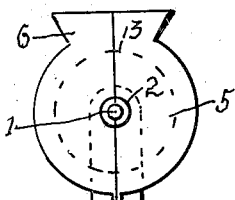
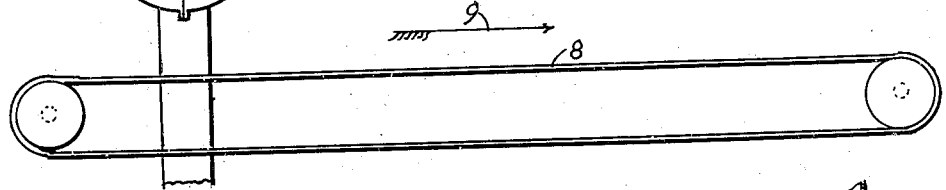
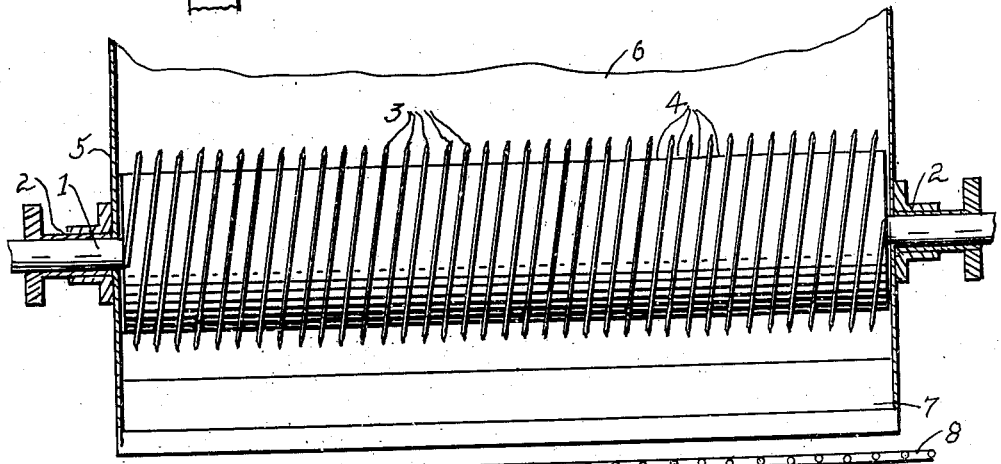
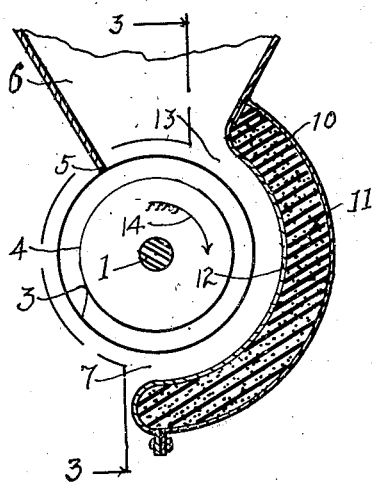

Patented Mar. 15, 1949

2,464,308

UNITED STATES PATENT OFFICE 2,464,308

NUT HULLER WITH CIRCULAR CUTTING BLADES

Frank C. Gullo, Cupertino, Calif.

Application February 18, 1946, Serial No. 648,215

1 Claim. (Cl. 146—10)

The present invention relates to a machine for removing the hulls from walnuts.

The hull on a walnut is a thick pulpy covering that is rather difficult to remove through manual manipulation, and it applies a very objectionable stain to the fingers when so handled.

It is an object of the present invention to provide a machine that will remove the hulls from walnuts in any quantity, cleanly and without the use of human hands.

It is also an object of the invention to provide a machine of the character indicated that will be economical to manufacture, simple in form and construction, that consists of few parts, and is highly efficient in its practical application.

In the drawing,

Figure 1 is a side elevational view of a machine embodying my invention, with parts broken away.

Figure 2 is a transverse sectional view through the hull cutter and the parts cooperating therewith, Figure 3 is a longitudinal sectional view through the same, on line 3—3 of Figure 2.

Figure 4 is a detail illustration of a portion of a cutter blade.

Referring now to the drawing in detail I show at 1 a shaft mounted to rotate about a horizontal axis in bearings 2, and having centrally mounted thereon a series of circular cutting blades 3 spaced apart by means of spacer blocks 4 which are also circular but of less diameter than the circular blades 3.

An enclosing casing is built up around the structure described as at 5, the casing 5 being formed to provide a hopper 6 discharging on to the blade structure 3—4, and to form a discharge passage as 7 leading from said blade structure 3—4 to discharge upon a carrier belt 8 moving in the direction of arrow 9.

Walnuts are of widely varying sizes from very small to very large, and this variation in size is present in every large run of walnuts put through the machine. In order to accommodate walnuts of all sizes, I provide a portion 10 of casing 5 concentric with the shaft 1 and spaced from the cutter blades 3 as shown. Within the portion 10 I place a lining of sponge rubber as at 11, and face the inside of this lining with a sheet of ordinary rubber at 12. The parts 11 and 12 provide a cushion of sufficient thickness to hold the smaller walnuts against the blades 3 and at the same time permit the larger walnuts to pass through the space 13 and be held in contact with the blades 3 with sufficient pressure to cut the hull and yet not with sufficient pressure to injure the shell of the walnut.

In operation a quantity of walnuts are dumped into the hopper 6, and from the hopper 6 they flow by gravity downwardly into the space 13. With the structure 1, 3, 4 rotating in the direction of arrow 14 the walnuts are carried down to discharge at 17 with the hulls so completely cut into small pieces as to be completely removed as the mass is carried along over the belt 8.

In order to make the blades 3 quickly grasp the walnuts and carry them into passage 13 the periphery of each blade is notched in the manner indicated at 16. These notches are spaced and made of such a depth that the hull will be cut and torn from the nut as it passes to the discharge at 7. This action is also facilitated by the arrangement of the blades 3, which are arranged at a slight angle to the perpendicular as shown in Figure 3. This arrangement is efficient in removing the hulls from the walnuts because since the blades rotate on a horizontal axis they apply a twisting action on the hull relative to the nut and consequently cause it to break loose from the nut and separate therefrom as they fall to the conveyor 8.

It is to be understood of course, that while I have herein shown and described but one specific embodiment of my invention, changes and modifications may be made within the scope of the appended claim without departing from the spirit of the invention.

I claim:

A nut-hulling machine comprising, a casing with a hopper feeding into the same, a rotatable shaft journaled in the casing and having spaced circular cutting blades thereon disposed in angular relation thereto, a passage leading from the hopper past the side of the blade assembly, and a cushion lining the side of the passage opposite to the blade assembly, said cushion being formed of sponge rubber faced with a sheet of ordinary rubber.

FRANK C. GULLO.

REFERENCES CITED

The following references are of record in the file of this patent:

UNITED STATES PATENTS

| Number | Name | Date |
| --- | --- | --- |
| 729,239 | Swart | May 26, 1903 |
| 1,455,449 | Riddle | May 15, 1923 |
| 1,460,004 | Warren | June 26, 1923 |

FOREIGN PATENTS

| Number | Country | Date |
| --- | --- | --- |
| 527,585 | Germany | June 19, 1931 |